United States Patent [19]

Baldwin et al.

[11] Patent Number: 4,757,204

[45] Date of Patent: Jul. 12, 1988

[54] CEILING MOUNTED PASSIVE INFRARED INTRUSION DETECTOR WITH DOME SHAPED LENS

[75] Inventors: John R. Baldwin, Danbury; William S. Kahl, Brookfield, both of Conn.

[73] Assignee: Cerberus AG, Switzerland

[21] Appl. No.: 823,261

[22] Filed: Jan. 28, 1986

[51] Int. Cl.[4] .................... G01J 1/00

[52] U.S. Cl. .................... 250/342; 250/353

[58] Field of Search .................... 250/342, 353; 350/96.2; 362/32

[56] References Cited

U.S. PATENT DOCUMENTS

| | | | |
|---|---|---|---|
| 4,052,616 | 10/1977 | Keller | 250/353 |
| 4,233,493 | 11/1980 | Nath | 362/32 |
| 4,271,360 | 6/1981 | Ward | 250/353 |
| 4,275,303 | 6/1981 | Mudge | 250/342 |
| 4,364,030 | 12/1982 | Rossin | 340/567 |
| 4,429,224 | 1/1984 | Wägli et al. | 250/342 |
| 4,484,075 | 11/1984 | Kahl et al. | 250/342 |
| 4,514,630 | 4/1985 | Takahashi | 250/342 |
| 4,647,149 | 3/1987 | McCartney et al. | 350/96.2 |

FOREIGN PATENT DOCUMENTS

| | | | |
|---|---|---|---|
| 0080114 | 6/1983 | European Pat. Off. . | |
| 3235250 | 3/1984 | Fed. Rep. of Germany . | |
| 2122339 | 1/1984 | United Kingdom | 250/353 |

OTHER PUBLICATIONS

Passiver Infrarot-Melder SIRM/G dated Oct., 1985 by BBC Brown Boveri.

*Primary Examiner*—Janice A. Howell
*Attorney, Agent, or Firm*—Brumbaugh, Graves, Donohue & Raymond

[57] ABSTRACT

A passive infrared intrusion detector is arranged for mounting to the ceiling of a room to be protected. Infrared radiation from points within the room is focused onto an infrared sensing element by a multi-segment dome-shaped lens. The multi-segment lens in a preferred embodiment has central, downwardly facing beams of infrared sensitivity and other beams of infrared sensitivity at multiple azimuth angles at selected elevation angles.

17 Claims, 2 Drawing Sheets

CEILING MOUNTED PASSIVE INFRARED INTRUSION DETECTOR WITH DOME SHAPED LENS

BACKGROUND OF THE INVENTION

The present invention relates to passive infrared intrusion detectors, and particularly to such detectors which are arranged for mounting to the ceiling of a room or other space to be protected.

U.S. Pat. No. 4,275,303, which is assigned to the same assignee as the present invention, describes a passive infrared intrusion detector which includes an enclosure having an aperture with a multi-segment Fresnel lens which is provided for focusing infrared energy onto a sensing element within the enclosure. As described in the referenced patent, there is provided a light source within the enclosure which provides for locating the orientation of the beams of infrared sensitivity of the device by observation of emitted light from the detector. The device described in the referenced patent, and many other prior art passive infrared intrusion detectors, are arranged for mounting to the wall of a room to be protected so that the beams of infrared sensitivity radiate outward from the wall, often in multiple directions.

It is an object of the present invention to provide a new and improved passive infrared intrusion detector which is arranged for mounting to the ceiling of a room to be protected, whereby beams of infrared sensitivity can radiate in many directions and reach areas throughout the room, which might be otherwise blocked from observation by a single wall mounted detector. It is a further object of the invention to provide such a detector which includes a dual element detector and a light emitting element within the detector for purposes of locating the orientation of the beams of infrared sensitivity.

SUMMARY OF THE INVENTION

In accordance with the present invention there is provided a passive infrared intrusion detector which is arranged for mounting to the ceiling of a room to be protected. The detector includes a housing having an upwardly facing wall arranged to mount to a surface, such as the ceiling, and an infrared sensing element within the housing facing away from the wall. A multi-segment fresnel lens forms at least a portion of the downwardly facing wall of the housing. The lens has a plurality of planar fresnel lens segments, each with at least one optical axis with respect to each electrode of the sensing element. The optical axes are approximately perpendicular to the planar segments and have selected elevation and azimuth angles with respect to the wall to provide beams of infrared sensitivity corresponding to the optical axes in a plurality of elevation angles and a plurality of azimuth angles. The azimuth angles are approximately uniformly distributed over 360° of azimuth.

In a preferred embodiment the multi-segmented lens is formed in the shape of a multi-faceted dome with the segments of the lens approximately equidistant from the sensing element. The lens may include a first segment which is substantially parallel to the wall with a vertical optical axis and a plurality of second segments each having an optical axis with a selected second elevation angle which is the same for all second elevation angles. There may also be provided a plurality of third lens segments, equal in number to the second lens segments and having equal third elevation angles greater than the second elevation angles. The lens may be conveniently fabricated from a single planar sheet of lens material with wedge-shaped slots between the second and third lens segments so that the second and third lens segments can be bent into planes substantially perpendicular to their corresponding optical axes. As thus formed the lens may be supported by a lens supporting frame with apertures corresponding to the lens segments. The frame may include inner and outer frame members. The detector may include an arrangement for providing movement of a printed circuit board to which the sensing element is mounted so that a light emitting element can be placed in the nominal location of the sensing element such that an installing technician can observe the light emitting element through the various lens segments and determine the position of the beams of infrared sensitivity.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
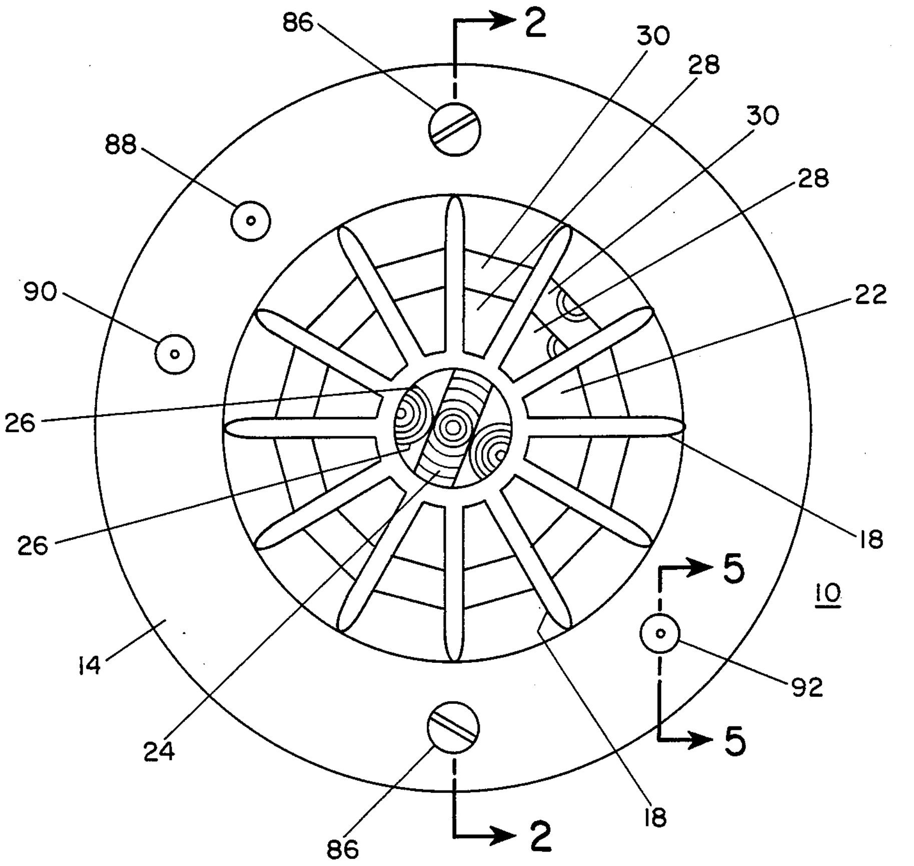
FIG. 1 is a bottom planar view of a ceiling mounted passive infrared intrusion detector in accordance with the present invention.
Figure 2:
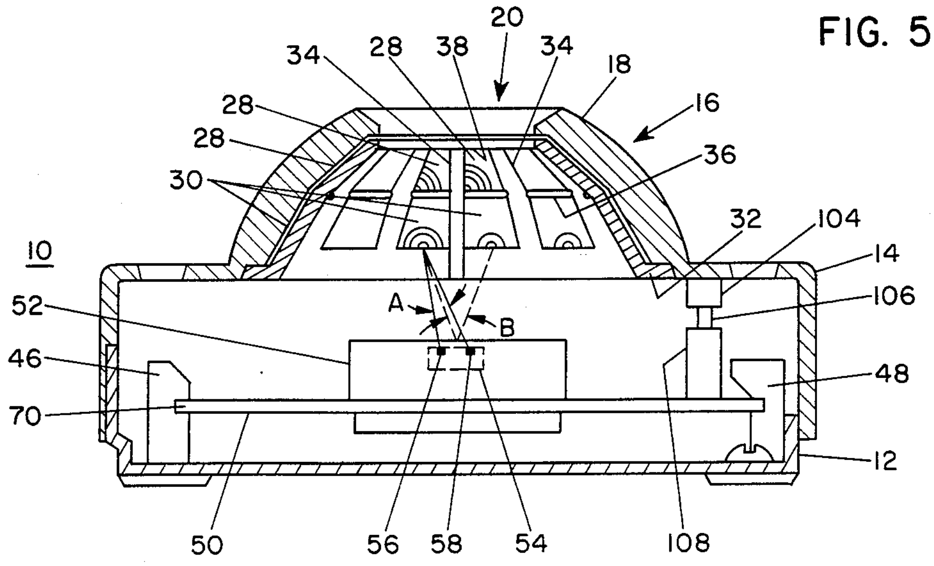
FIG. 2 is a cross-sectional view of the detector of FIG. 1.

In FIGS. 1 through 4 there are shown various views and details of a preferred embodiment of a passive infrared intrusion detector 10 in accordance with the present invention. The detector 10 includes a housing which is formed by a base member 12 which is arranged for mounting to a surface, such as a ceiling, and a cover member 14. In normal usage the view shown in FIG. 1 would be observed from directly under the detector 10 as it is mounted on a ceiling. The cross-sectional view of FIG. 2 is inverted from the normal ceiling mounted orientation. Included on cover member 14 is a lens array 16 which includes a plurality of lens segments arranged in various planes and forming a dome-like lens by which passive infrared radiation is focused onto a sensing element 54 located within the housing of detector 10. Cover member 14 includes structural members 18 which separate various segments of the multi-segment lens 22. Structural members 18 provide for rigidity of the arrangement and form an outer frame member which has apertures corresponding to the lens segments. An inner frame member 32 is provided such that the lens 22 is located between inner frame member 32 and the outer frame formed by structural members 18. Inner frame member 32 has corresponding apertures which are formed between structural members 34, which correspond to outer structural members 18. The inner frame 32 further includes transverse structural members 36, which are shown in FIG. 2.

For purposes of description, it will be understood that references to elevation angle refer to the measurement of the angle between a given direction and the nominal vertical axis of the device, which would be vertical in the FIG. 2 view. References to azimuth direction would be measured relative to the rotational symmetry of the device as viewed in FIG. 1. Accordingly, it may be seen that the multi-segment lens 22 includes a central lens segment which is positioned in the central aperture 20, noted in FIG. 2, along the vertical axis. The central lens segment includes three operative lens areas including a central lens area 24, which has an optical axis with respect to sensor 54 along the vertical axis and two surrounding lens areas 26 which have optical axes which are displaced slightly from the vertical axis and which have azimuth directions of 90 and 270 as viewed in FIG. 1. It should be noted that the central optical axes of lens area 24 is along the vertical direction and that the lens segment is planar in configuration and perpendicular to the central optical axis. The remaining optical axes for lens areas 26 are not exactly perpendicular to the central lens segment, but are approximately perpendicular by reason of the angular displacement from perpendicular of approximately 15 degrees.

In a radial outward direction from the first lens segment, which includes lens areas 24 and 26, there is provided a plurality of second planar lens segments 28. In the embodiment illustrated in FIG. 1 there are provided twelve second lens segments 28. Each of the second lens segments 28 has an optical center, through which its optical axis passes, which is approximately at a corner of the corresponding aperture area in the frame formed by structural members 18 and 34. The optical center is illustrated by the curved lines in FIG. 1 and FIG. 2 which illustrate schematically the lines of the fresnel lens which forms the second lens segments 28. The second lens segments 28 are arranged at an angle of approximately 49° from the vertical axis and they all have optical axes at a 49° elevation angle. The azimuth direction of the optical axes of the second lens segments are spaced at 30° intervals around 360°. The second lens segments are tilted with respect to the vertical axis so that the optical axes of these lens segments is approximately perpendicular to the lens segments themselves. Accordingly as seen in FIG. 2, the second lens segments 28 are tilted at an angle of approximately 49°.

The detector shown in FIGS. 1 and 2 includes a plurality of 12 third lens segments 30 which are tilted at a further angle of approximately 30° from the vertical axis of the device. The optical centers of the third lens segments 30 are located at about the center of the outermost boundary of the lens segments 30 as illustrated in FIGS. 1 and 2. Again the lens segments are tilted at an angle of about 30° from the vertical axis so that the optical axes of these lens segments with respect to detector 54 is approximately perpendicular to the lens segments. It should be noted that the third lens segments 30 also have optical axes which are arranged at 30° spacings around the azimuth directions, but that these third lens segment optical axes are arranged at azimuth angles approximately between the azimuth angles of the adjacent second lens segments 28 and at an elevation angle of 60° from the vertical axis. Thus, when the device is used to protect a room, an intruder walking between the beams of infrared sensitivity of the third lens segments 30 toward the center of the room would come directly into the infrared beam of sensitivity of the second lens segments 28.

Figure 3:
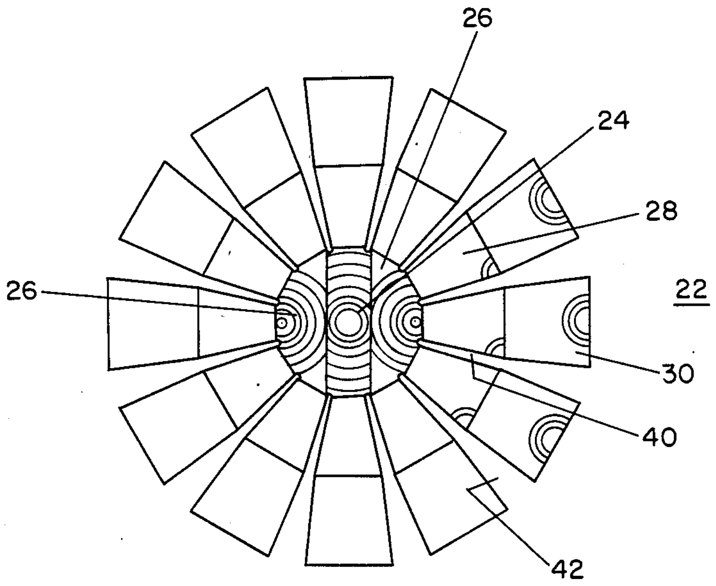
FIG. 3 is a plane view of the multi-segment lens used in the FIG. 1 detector as formed in a planar configuration.

FIG. 3 illustrates the method for forming the domed-shaped multi-segment fresnel lens 22 which is used in the device illustrated in FIGS. 1 and 2. A planar sheet of fresnel lens material is formed with the lens grooves as illustrated in FIG. 3. The first central aperture area is formed with active lens area 24 and the surrounding two active lens areas 26 with fresnel lens grooves as illustrated. The second lens segments 28 are also formed as shown surrounding the central area and the third lens segments 30 are formed on the outermost periphery of the planar lens. Doubly tapered grooves 40, 42 are formed in the planar lens 22 as illustrated to enable the second lens segments 28 to be folded at an angle of approximately 41° from the axis of symmetry of the planar lens 22 and to enable the third lens segments 30 to be folded at an angle of approximately 60° from the axis of symmetry. Accordingly the planar lens as shown in FIG. 3 can be folded into the dome-shape lens shown in FIGS. 1 and 2 which is held between outer frame 18 and inner frame 32.

Figure 4:
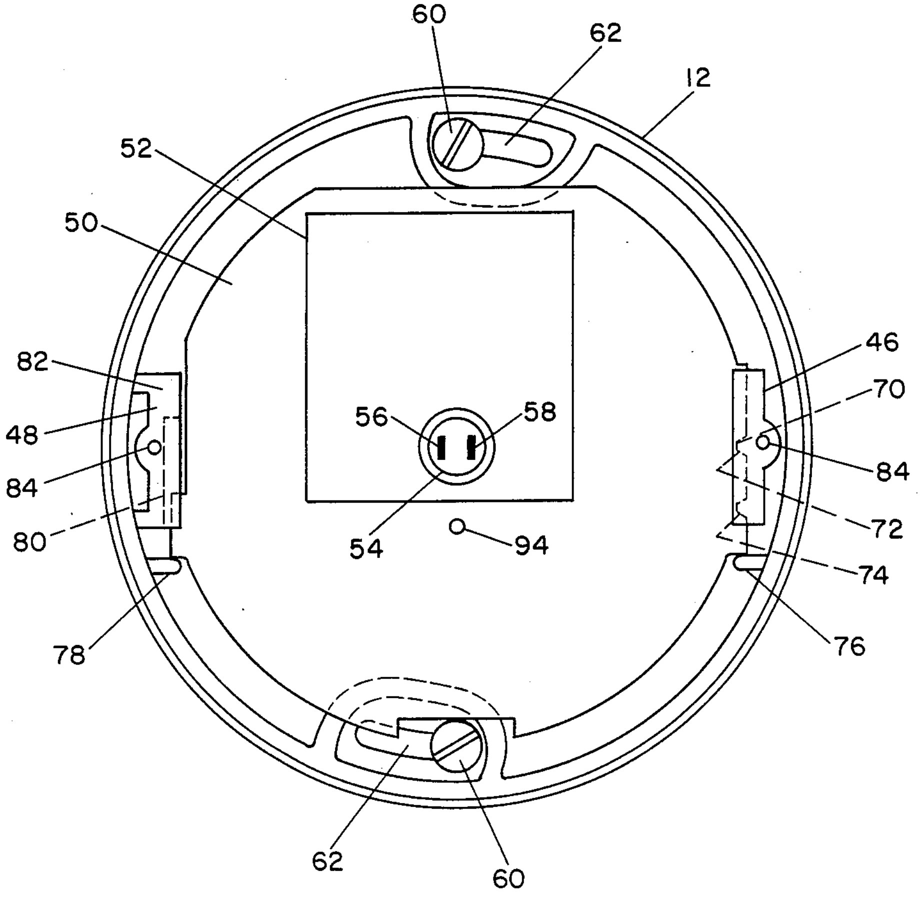
FIG. 4 is a view of the detector of FIG. 1 with the cover and lens removed.

An aspect of the preferred embodiment of the present invention includes the separation of the active electrodes of sensing element 54. As illustrated in FIG. 2 and FIG. 4 sensing element 54 includes sensing electrodes 56 and 58, such as pyroelectric detectors, known in the art of passive infrared intrusion detectors. The electrodes are connected in output opposition in the device to provide resistance to false alarms caused by ambient temperature changes and detection of an intruder as the infrared radiation on one of the electrodes increases with respect to the radiation on the other.

In conventional wall mounted infrared intrusion detectors the electrodes corresponding to 56 and 58 are each about 1 millimeter wide and are separated by a distance of approximately 1 millimeter. In the ceiling mounted environment with lenses separated from the sensing element by a distance of about 1.2 inches, corresponding to the focal length of the lens segments, the 1 millimeter spacing may be too small, because the dual beams of infrared sensitivity at the relatively close ranges experienced by a ceiling mounted detector may be so close together that an intruder will enter both beams of infrared sensitivity almost simultaneously, thus causing a failure of the detector to indicate the presence of an intruder by reason of a change in the output of one electrode with respect to the other. In order to correct this possible failure, the spacing between electrodes 56 and 58 is increased to approximately 4 millimeters. This increases the separation of the dual beams of infrared sensitivity with respect to each of the lens segments. The separation of the dual beams for infrared sensitivity for a particular lens segment is determined by the angle A, shown in FIG. 2, of the two electrodes 56, 58 as viewed from the optical center of the lens segment. Increasing the spacing between the electrodes 56 and 58 increases the separation of the dual beams of sensitivity for each segment. In accordance with the preferred embodiment the angular separation between the beams of sensitivity, which is determined by angle A between the sensing electrodes as viewed from the focussing lens, is made to be approximately 9.5°. This is approximately $\frac{1}{3}$ the angular separation of the lens segments indicated by angle B, as viewed from the sensing element 54 also shown in FIG. 2. The separation of the dual beams of sensitivity determined by angle A is dependent on the anticipated ceiling height and should be at least 5° or greater.

As illustrated in FIGS. 2 and 4 the sensing element 54 is mounted to a circuit board 50 within the housing formed by base member 12 and cover 14. The sensing element 54 and sensitive portions of the electronics are enclosed within a radiation shield 52 to protect against stray electronic interference. An aperture in the side of enclosure 52 facing the multi-segment lens 22 has an opening through which infrared radiation can reach sensing element 54.

Circuit board 50 also includes a light source, such as light emitting diode 94. Diode 94 is arranged at a point which is separated from sensing element 54 by a selected distance, and the circuit board 50 is arranged to be displaced within the base member 12 by the same selected distance, so that light emitting diode 94 can be placed at the nominal location of sensing element 54. For this purpose the circuit board is supported by a first supporting member 48 which includes a groove 80 holding the end of the circuit board. A protruding tab on the circuit board engages a stop member 78 formed on base 12 when the sensing element 54 is at the center of housing 12 and against an opposite stop member formed as end wall 82 of slot 80 when the light emitting diode 94 is at the center of base 12. A second supporting member 46 on the opposite side of circuit board 50 also includes a slot for holding the end of the circuit board, and the circuit is provided with notches 72 and 74 which are retained in a member 70 formed as part of support 46. Stop 76 is also provided for limiting the movement of circuit board 50. Support members 46 and 48 may be bent in an outward direction for insertion or removal of circuit board 50 and are provided with threaded holes 84 for receiving cover holding screws 86, thus locking the circuit board into position when the cover 14 is secured by screws 86 to base 12. When light emitting diode 94 and circuit board 50 are moved into position so that the light emitting diode 94 is at the center of base member 12, an arrangement may provide for activating the light emitting diode 94 and thereby projecting visible light beams through the various segments of lens 22 in directions corresponding to beams of infrared sensitivity which occur when sensing element 54 is in the central position. One such arrangement is illustrated in FIG. 2 wherein a boss 104 is provided on cover 14 and a switch 108 is mounted on circuit board 50. When circuit board 50 is in the central position, boss 104 activates switch plunger 106 on switch 108 when cover 14 is attached to base 12. When cover 14 is removed, switch 108 acts as a tamper switch and gives a signal indicating the cover has been removed. When board 50 is moved to its off outer position, boss 104 also does not engage plunger 106 and a tamper signal is given. The switch in the tamper position also activates pattern locating LED 94. With LED 94 activated, the orientation of the visible beams can be adjusted in azimuth by loosening screws 60 which mount base 12 to the ceiling and rotating base 12 so that screws 60 slide in curved slots 62. Slots 62 have an angular adjustment of approximately 30°, which corresponds to the spacing between adjacent beams formed by the second lens segments and third lens segments in the azimuth direction.

The cover 14 of intrusion detector 10 includes signal lights 88, 90 and 92 shown in FIG. 1. Signal lights 88 and 92 are alarm indicating lights which are illuminated when the detector signals the detection of an intruder. Two lights are provided so that the alarm condition can be observed from any azimuth position without obstruction by the dome shaped lens. Signal light 90 is a pulse-counting light which signals detection of an intruder or an interference which is insufficient to trigger an alarm. Both of these lights are helpful to the installer in "walk-testing" the device after the beams have been visibly aligned by the use of the pattern locating feature and the device has been restored to its detecting function.

Figure 5:
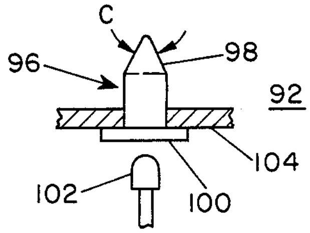
FIG. 5 is a partial cross-sectional view of the cover of the FIG. 1 intrusion detector.

Lights 88, 90 and 92 have light-spreading light guide as shown in FIG. 5. A specially shaped light guide 96 of generally cylindrical shape is provided with a conical end portion 98 and an enlarged base 100. The light guide is press fitted or otherwise mounted in a bore on cover 14 arranged above a light source such as LED 102. Conical end portion 98 preferably has a cone angle C of approximately 60°. The conical tip portion 98 enables light from LED 102 to be observed from any angular direction in azimuth around the detector provided there is no visual blockage from other detector portions.

While there has been described what is believed to be the preferred embodiment of the present invention, those skilled in the art will recognize that other and further changes may be had thereto without departing from the spirit of the invention, and it is intended to claim all such changes and modifications as fall within the true scope of the invention.

I claim:

1. A passive infrared intrusion detector arranged for mounting to the ceiling of a room to be protected, comprising:
   - a housing having an upwardly facing wall arranged to mount to a surface;
   - an infrared sensing element within said housing and facing away from said wall;
   - and a multi-segment fresnel lens forming at least a portion of a downwardly facing wall of said housing, said lens having a plurality of planar fresnel lens segments, each lens segment being spaced from said sensing element by a distance which is approximately equal to its focal length, each lens segment having at least one optical axis with respect to said sensing element for focusing infrared energy along said optical axis directly onto said sensing element, said optical axes being approximately perpendicular to to said planar segments and having selected elevation and azimuth angles with respect to said wall to provide beams of infrared sensitivity corresponding to said optical axes in a plurality of said elevation angles and a plurality of azimuth angles, said azimuth angles being of approximately uniform distribution over 360° of azimuth.

2. A detector as specified in claim 1 wherein said multi-segment lens is formed in the shape of a multi-faceted dome.

3. A detector as specified in claim 2 wherein the segments of said lens have equal focal lengths and are approximaely equi-distant from said sensing element.

4. A detector as specified in claim 1 wherein said multi-segment lens includes a first segment substantially parallel to said wall with a vertical optical axis and a plurality of second segments each having an optical axis with a selected second elevation angle, all of said second elevation angles being equal.

5. A detector as specified in claim 4 wherein all of said lens segments are formed on a planar sheet of lens material, and wherein there are provided wedge-shaped slots between said second lens segments, whereby each of said second lens segments can be bent into a plane approximately perpendicular to its corresponding optical axis.

6. A detector as specified in claim 4 wherein said multi-segment lens further includes a plurality of third lens segments, equal in number to said second lens segments, and having equal third elevation angles greater than said second elevation angles.

7. A detector as specified in claim 6 wherein all of said lens segments are formed on a planar sheet of lens material, and wherein there are provided double wedge shaped slots between said second and between said third lens segments whereby said second and third lens segments can be bent into planes approximately perpendicular to their corresponding optical axes.

8. A detector as specified in claim 6 wherein said third lens segments have optical axes with azimuth angles between the azimuth angles of the optical axes of said second lens segments.

9. A detector as specified in claim 1 wherein there is provided a lens supporting frame, said frame having apertures corresponding to said lens segments.

10. A detector as specified in claim 9 wherein said frame includes inner and outer frame members, each having said apertures.

11. A detector as specified in claim 1 wherein said sensing element is mounted to a printed circuit board within said housing, wherein said circuit board is provided with a light source located at a selected distance from said sensing element, and wherein said circuit board is arranged for transverse movement corresponding to said selected distance whereby said light source can be moved into a position corresponding to the operative position of said sensing element.

12. A detector as specified in claim 1, wherein said housing is arranged for mounting to said surface by slotted mounting holes, and wherein said slotted mounting holes are arranged to provide for rotation of said housing by an azimuth angle corresponding to the azimuth angle between adjacent ones of said optical axes.

13. A detector as specified in claim 1 wherein said sensing element has multiple two photosensitive electrodes, and wherein said photosensitive electrodes are arranged at a selected spacing so that the angular spacing of said electrodes as viewed from said lens segments is at least 5 degrees.

14. A detector as specified in claim 1 wherein there is provided an indicator light source within said housing and a light guide passing through said housing, said light guide having an outer end formed as a conical point for projecting light from said light source in all directions of azimuth with respect to said housing.

15. In an infrared intrusion detector having an indicator light source, a light guide for projecting light from said light source within a housing, comprising a cylindrical light transparent member passing through a wall of said housing adjacent said light source and having an outer end conically tapering to a point outside said housing, said outer end having a cone angle selected to permit light to emerge from said conical surface in all directions of azimuth with respect to said housing.

16. A light guide as specified in claim 15 wherein said outer end has a cone angle of approximately 60°.

17. A light guide as specified in claim 15 wherein said conically formed outer end tapers to a round point.

* * * * *